(12) United States Patent
Weatherman et al.

(10) Patent No.: US 9,101,868 B2
(45) Date of Patent: *Aug. 11, 2015

(54) COMPOSITION AND METHOD FOR DUST SUPPRESSION WETTING AGENT

(76) Inventors: Greg Weatherman, Arlington, VA (US); Marcia Cash, Arlington, VA (US)

(*) Notice: Subject to any disclaimer, the term of this patent is extended or adjusted under 35 U.S.C. 154(b) by 1074 days.

This patent is subject to a terminal disclaimer.

(21) Appl. No.: 13/067,417

(22) Filed: May 31, 2011

(65) Prior Publication Data

US 2012/0000361 A1    Jan. 5, 2012

Related U.S. Application Data

(63) Continuation-in-part of application No. 12/155,447, filed on Jun. 4, 2008, now Pat. No. 7,951,227.

(51) Int. Cl.
*B01D 47/06* (2006.01)
*B01D 49/00* (2006.01)

(52) U.S. Cl.
CPC .............. *B01D 47/06* (2013.01); *B01D 49/003* (2013.01); *B01D 2221/08* (2013.01)

(58) Field of Classification Search
None
See application file for complete search history.

(56) References Cited

U.S. PATENT DOCUMENTS

| 2,157,879 | A | * | 5/1939 | Zublin | 423/223 |
| 3,851,041 | A | * | 11/1974 | Eickmeyer | 423/223 |
| 3,924,157 | A | * | 12/1975 | Peters et al. | 361/225 |
| 5,602,279 | A | * | 2/1997 | Thaler et al. | 562/526 |
| 7,951,227 | B2 | * | 5/2011 | Weatherman et al. | 95/149 |
| 2011/0247336 | A9 | * | 10/2011 | Farsad et al. | 60/685 |
| 2013/0040373 | A1 | * | 2/2013 | Weatherman et al. | 435/266 |

* cited by examiner

*Primary Examiner* — Robert A Hopkins
(74) *Attorney, Agent, or Firm* — Jonathan Grant; Grant Patent Services

(57) ABSTRACT

This disclosure teaches a composition and process which makes it possible to remove floating particulates or prevent the dissemination or particulates, by the misting of a solution that readily captures any particulate material in the air. More specifically, the present disclosure teaches the composition and use of aromatic compounds that are semi-volatile organic compounds (SVOCs) or slow evaporators in water-based carriers with surfactants as the misting/fogging agent for dust suppression. The particulate material is lowered to surfaces and removed by vacuuming, damp-wiping or using a dry cloth with a cationic charge (static cloth). This method can be achieved with neutral air pressure differentials in the work areas.

21 Claims, No Drawings

COMPOSITION AND METHOD FOR DUST SUPPRESSION WETTING AGENT

This application is a continuation-in-part of U.S. application Ser. No. 12/155,447, filed Jun. 4, 2008 now U.S. Pat. No. 7,951,227.

BACKGROUND OF THE DISCLOSURE

Up until 1974, asbestos had been respected and used in industry due to its excellent incombustible and refractory properties, heat-insulating properties, and sound-absorbing qualities. Normally, asbestos was incorporated on walls, pipes, and industrial equipment in schools, residences, factories, office buildings, ships, and older motor vehicles, whenever sound, heat, or fire proofing was required.

However, over time, asbestos fibers tend to become airborne, as the surface spray coated with asbestos is vibrated or an object collides against the asbestos-coated surface or when the binder used in the coating deteriorates. Often, and perhaps most commonly, asbestos fibers fill the air when a building is renovated or demolished. The problem with asbestos fibers filling the air is that the fibers are environmentally hazardous, and, if inhaled, may cause asbestosis, mesothelioma or lung cancer. Thus, there is an urgent need to remove asbestos in tens of thousands, and perhaps hundreds of thousands, of buildings nationwide. Internationally, there are many millions of buildings from which asbestos must be removed. This will lead to many cases wherein asbestos fibers become airborne, often in an enclosed room, thereby causing a health hazard to many thousands of people.

In the past, asbestos containing materials was removed by workers wearing dust respirators and dustproof clothes. There have been a number of different methods used to remove asbestos. Asbestos layer(s) were removed by rod-type scrapers or wire brushes while spraying a wetting agent or amended water on the building material to be removed in a sealed workroom made for the removal operation. Another method of asbestos removal involves solidifying the surface of the asbestos coating by the use of a resin or a liquid chemical to encapsulate. In yet another method, asbestos-coated surfaces are enclosed with boards or the like.

While the latter two methods described above are merely temporary measures, the first-mentioned method comprising physical removal of asbestos is, in fact, a permanent solution. However, the manual removal of asbestos by use of rod-type scrapers or wire brushes requires much labor and leads to high working expenses due to the need to have a person spraying a wetting agent for dust suppression for each person removing building material. Most importantly, asbestos fibers generated in the removal operation are suspended in air for a long time, and the sealed workroom must be left sealed for a long time. Forced removal of the suspended asbestos fibers requires the use of HEPA filters and a large-capacity dust collector, leading to extremely high working expenses. Additionally, the manual removal of asbestos by the workers has the problem that many portions of asbestos tend to be left unstripped, particularly at narrow areas near corners or the existing piping, and the portions of asbestos left unstripped may scale off later. Furthermore, even with the use of the dust collector, a small amount of the asbestos fibers separated from the original surface may remain in air or accumulate at the corners of the floor, the asbestos fibers being very difficult to collect.

Dust suppression is used to clean the air of particulate matter. The particulate can be inorganic material such as asbestos (chrysotile, amosite, crocidolite, tremolite, actinolite, anthrophyllite, etc.), asbestiform minerals, silica, metals, salts or manmade polymers such as nylon, plastic, fiberglass, nanoparticles, etc. Particulate matter can also originate from biological materials such as germs, insects, plants, animal based allergens, proteomic proteins of health concerns, etc. The particles can be from 1 micron to 50 microns or smaller which is measured in nanometers. 1 micron equals 1,000 nanometers.

Various dust suppressant compositions and methods are known in the art for spraying in air to reduce air-borne dust or for spraying on substances which develop dust.

U.S. Pat. No. 4,369,121 (Callahan et al.) discloses a composition for controlling dust which comprises a cellulose ether and a wetting agent such as an ethylene oxide condensate of nonyl- or octylphenol, ethylene oxide condensates of straight chain alcohol, fatty acid amides, quaternary ammonium compounds, organic phosphate esters, and sulfonic acids.

U.S. Pat. No. 4,169,170 (Doeksen) discloses a composition and method for controlling dust during coal transportation wherein the composition comprises an aqueous solution containing an asphalt emulsion or a black liquor lignin product and a water soluble ethoxylated alkyl phenol.

U.S. Pat. No. 4,425,252 (Cargle et al) discloses an aqueous coal dust abatement composition including a water soluble sulfonic acid salt and ethoxylated nonyl phenol.

U.S. Pat. No. 4,428,984 (Shimizu et al) discloses a method of preventing dusts by spreading an aqueous solution including an ethoxylated alkyl phenol, alcohol, fatty acid, amine or fatty acid amide and a polyhydric alcohol.

U.S. Pat. No. 4,487,615 (Taylor et al.) discloses a method of reducing mine dust by spraying water including a surfactant produced by reacting ethylene oxide with linear primary alcohols.

U.S. Pat. No. 4,136,050 (Brehm) and U.S. Pat. No. 4,171,276 (Brehm) disclose a dust suppression composition comprising an aqueous solution of alkyl phenoxy polyethoxy ethanol and a copolymer of ethylene oxide and propylene oxide.

U.S. Pat. No. 5,052,756 (Wada et al.) discloses a process for separation of an asbestos-containing material from a surface to which the asbestos-containing material is adhered, while preventing floating of dust of the removed asbestos-containing material. The process requires jetting of pressurized water from a plurality of nozzles to the surface at a pressure of at least 80 kg/cm.sup.2 so as to wet and remove the asbestos-containing material therefrom by the energy possessed by the pressurized water.

Dust suppression for interior spaces is generally accomplished by using a combination of engineering controls and a misting agent. Misting agents are sometimes referred to as "amended water" or water with a surfactant. The term "amended water" comes from 29 CFR 1926.1101 or the OSHA regulations for asbestos in construction. Fogging is another term used in some applications common to greenhouses and cleanrooms where pesticides are administered.

The air is misted with the misting agent. The water droplets from the misting agent adhere to the particulate material in the air that is the offending agent to health or the environment. This increases the weight of the particulate material. This forces the particulate material to drop to surfaces due to the increased weight or specific gravity. This allows the particulate materials to be removed by cleaning methods on surfaces or to be "locked down" to a surface (such as a floor or wall) with a paint or sealer so the particles are permanently adhere to the surfaces.

The problem with the first scenario is that the misting agent must not evaporate too quickly or the particulate material will become airborne again. The problem with the second scenario of the particulate materials is that the asbestos needs to be removed rather than hidden under a paint, glue or polymer film that may be disturbed during a future renovation or catastrophic event like fire, flood, etc.

In each circumstance, the offending agent or particulate is removed from the air to prevent the particulate from entering the respiratory tract and possibly the bloodstream. Environmental controls use techniques such as pressurization (positive and/or negative) differentials of a contained area and mechanically exhausted through a HEPA filter and/or water baffle. This is largely done to limit cross-contamination during the removal of the particulate material or offending agent.

Towards that end, many of the techniques involve the use of "negative air pressure differential" conditions, which are not desirable because the "amended water" droplets are pulled out of the contained area too quickly and the surfaces dry too quickly to capture particles effectively.

The contained area is usually "flooded" with amended water in an attempt to ensure particle capture. It takes a high amount of the "amended water" due to the use of the negative air pressure machines. The job site becomes awash in water that must be constantly removed. The area is saturated, sometimes causing water damage to the non-remediated areas. Microbial growth is encouraged by the high-humidity conditions brought about by traditional methods.

The above dust suppressing compositions and methods all have various disadvantages in that the compositions are not immediately effective and require an extended time for satisfactory performance or that the compositions include excessively toxic or other less biodegradable materials.

There is therefore a need for a dust suppressant composition which quickly enhances the settling of air-borne dust and which is substantially biodegradable and benign in the environment.

SUMMARY OF THE DISCLOSURE

Accordingly, this disclosure teaches a composition and process which makes it possible to remove floating particulates or prevent the dissemination or particulates, by the misting or fogging of a solution that readily captures any particulate material in the air.

More specifically, the present disclosure teaches the composition and use of semi-volatile organic compounds (SVOCs) or slow evaporators in water-based carriers with surfactants as the misting/fogging agent for dust suppression. The particulate material is captured by the fogged or misted solution, whereupon gravity causes the solution to fall to the floor and other surfaces whereupon it is removed by vacuuming, damp-wiping, or by using a dry cloth with a cationic charge (static cloth). Any other method may also be used.

For the purposes of this application, a semi-volatile organic compound (SVOC) is an organic compound which has a boiling point higher than water and which may vaporize when exposed to room temperature (or higher).

Misting or fogging with this type of agent replaces traditional "amended water" spraying during dust-producing activities. This method relies on the slow-evaporating misting agent's ability to capture and hold particles long enough to be captured by wiping or vacuuming. This disclosure is more economical, environmentally preferable or green and more efficient than current methods or uses.

In another embodiment of the disclosure, dust suppression is performed under "neutral air pressure differential" conditions because the "mist" or "fog" should remain suspended in the air for a sufficient time to capture particles.

In one embodiment of this disclosure, particles as low as 10 nanometers can be captured and removed.

In yet another embodiment of the disclosure, surfactants are used to help keep the water tension at a desirable level to bind the particulate materials.

DETAILED DESCRIPTION OF THE DISCLOSURE

Following or during the removal of asbestos or dust laden materials during the renovation or demolition of a building, ship, or machinery, a fine mist or spray should use the composition containing the semi-volatile organic compounds which is preferably applied to suppress and trap asbestos, dust, and other airborne particles.

More specifically, these SVOC, aromatic compounds include but not limited to: phenols, phenyls, benzyls, glycols, glycerol, butadienes, carboxyl groups, terpenes, phthalates, anthracenes, isophorenes, plant esters, ketones, amines, glycol ethers, pyrenes, toluenes, heterocyclic compounds, polycyclic aromatic hydrocarbons, mono and di aromatics, polyols, xanthenes, plant essential oils, enzymes from microbes, etc, and combinations thereof. The most preferred compounds are phenol, sodium phenate and glycerol. However, the choice of SVOCs may be dependent on humidity, temperature, overall climate, material being removed, gallons per hour of mist spray, cubic feet of air being cleaned, etc. Also, a mixture of SVOC's may be used, so that different particles of different sizes and charges may be captured. A preferred mixture of SVOC's may include phenol: 1.56%, and sodium phenate: 0.06%

The SVOCs may comprise from between about 0.25% and about 20% of a mixture by weight, with a preferable range of between about 0.25% and about 10%.

In one embodiment of the disclosure, the use of these compounds will require respirators that have filters rated by CDC NIOSH for "organic vapors" to follow OSHA regulations.

The mixture also contains surfactants and/or detergents to help keep the water tension at a desirable level to bind the particulate materials. Surfactants and/or detergents also help emulsify the SVOCs in the water carrier. The surfactants and/or detergents that are used may be borates, cationic surfactants, anionic surfactants, neutral charged surfactants, amid surfactants, etc. These compounds include but are not limited to: Sodium dodecylsulfate (SDS), Sodium deoxycholate (DOC), N-Lauroylsarcosine Sodium salt, Lauryldimethylamine-oxide (LDAO), Cetyltrimethylammoniumbromide (CTAB), Bis(2-ethylhexyl)sulfosuccinate Sodium salt, 1-Octanesulfonic acid sodium salt, Sodium 1-butanesulfonate, Sodium 1-decanesulfonate, Benzalkonium chloride, Benzethonium chloride, N-Dodecyl-N,N-dimethyl-3-ammonio-1-propanesulfonate, lignin based surfactants, coconut based surfactants, etc. It is preferable to use sodium dodecylsulfate (SDS), as surfactants, and most preferable to use sodium borates. A mixture of cationic surfactants, anionic surfactants, and nonionic surfactants can be used. Overall, the total surfactants can range from about 0.1% to 3% by weight.

Optionally, other components may be included in the solution. These components include:

TABLE-US-00001

| SVOC % | Surfactant/Detergent % | Optimum Water % |
|---|---|---|
| Lavender oil: 0.02-2%; 1%, *Glycerol: 0.2-1%; 0.5% | Quaternary Ammonium: 0.25-25%; 25% *Glycerol: 0.2-1%; 0.5% | 73.5% |
| *Glycerol: 0.2-1%; 0.5%, D-limonene: 0.5-2%; 1%, | Benzethonium chloride: 0.25-2%; 1%, *Glycerol: 0.2-1%; 0.5% | 97.5% |
| Pine oil: 0.25-2%; 1%, Thymol: 0.25-2%; 1%, Eucalyptol: 0.25-2%; 1%, *Glycerol: 0.2-1%; 0.5% | Lignin Surfactants 1%, *Glycerol: 0.2-1%; 0.5% | 95.5% |
| Phenol: 0.1-2%; 1.6%, Sodium phenate: 0.01-0.1%; 0.06%, *Glycerol: 0.2-1%; 0.5% | SDS: 0.06-0.4%; 0.3%, Sodium borate: 0.9-0.55; 0.47%, *Glycerol: 0.2-1%; 0.5% | 97.11% |
| O-phenylphenol: 0.04-0.3%; 0.22%, *Glycerol: 0.2-1%; 0.5% | Benzethonium chloride: 0.14-0.8%; 0.70%, *Glycerol: 0.2-1%; 0.5% | 98.58% |
| Oil of Laurel: 0.25-2%; 1%, Linalool: 0.25-2%; 1%, *Glycerol: 0.2-1%; 0.5% | Triton 100: 0.1-1%; 0.5% *Glycerol: 0.2-1%; 0.5% | 97% |

Each set of numbers starts with a percentage range followed by the optimal percentage after the semicolon
*Glycerol is both a SVOC and a surfactant
Water is given in optimum levels but may change with the range used.
Perfume agents may be added at approximately 0.05% in the place of the water.

There is little need for adding emulsifying ingredients since surfactants and detergents tend to emulsify the SVOC's that are slightly miscible.

There is also little need for adding preservative ingredients since surfactants, detergents and some SVOCs tend to act as preservatives (examples: Phenols, quaternary ammoniums, etc).

Different combinations of aromatic compounds (SVOCs) and surfactants can be mixed at small amounts each to achieve the same as large amounts of a singular aromatic SVOC compound and a singular surfactant.

Mixing combinations of compounds may lower toxicity while maintaining the benefits of the disclosure.

The aromatic compounds are also emulsified so the water molecule(s) slowly evaporate without creating any permanent films like a paint, polymer, plastic, etc.

It is also most advisable to include a fire retardant, particularly when the solution contains glycerol, propylene glycol, or other combustible chemicals. In one preferred embodiment, the fire retardant is a borate. In another preferred embodiment the fire retardant is a sodium or potassium borate. As noted in the chart supra, borates can serve as detergents, and thus can serve a dual purpose in the solution. The amount of the fire retardant may range from 0.01% to 1.5%. In another embodiment, the amount of the fire retardant may range from about 0.1% to about 1%, and in another embodiment, from about 0.1% to about 0.5%. Depending on the material being suppressed, however, there may be other variations in the amount of fire suppressant included in the solution or liquid mixture.

The solution described above is water soluble, and does not harden like a plasticizer, but instead can be removed as described, infra.

As noted above, a major problem with traditional dust suppression techniques is the large amount of "amended water" that must be used due to the concurrent use of engineering controls such as negative air pressure differential enclosures. This negative air pressure commonly used in asbestos abatement (OSHA 29 CFR 1926.1101) and microbial remediation (ACGIH) causes many possible misting agents to evaporate too quickly. These regulations and publications call for a negative pressure differential enclosure measured with a manometer at negative 0.02 inches of water column or greater. This is equal to negative 5 pascals or greater. Generally, this means there is approximately 4 air changes per hour or greater as more air leaves the contained area than enters it. The purpose of the contained area under negative air pressure is to help prevent cross-contamination at the expense of using more water than necessary at the expense of our natural resources.

The new method is "environmentally preferable" or "green" due to the significant reduction in water usage and electrical usage. First, the misting agent is a slow evaporator. Second, the work areas are contained with "critical control barriers" and necessary plastic sheeting or other material to prevent migration of contaminants outside the work area. Preferably, the work area is under "neutral" air pressure differential or between +0.02 to −0.02 inches of water column. Preferably, only the areas under negative air pressure are the decontamination chambers where workers remove waste material or their personal protective equipment before passing through the shower between the equipment room and the clean room or entrance/exit. (equipment room, shower).

There are various machines that can be used to mist or fog the air with the misting agent. It should be noted that there is a difference between the terms "misting" and "fogging". Fogging is to produce an average micron band droplet size of generally 35-50 microns or less. Some water droplets will be below or above 50 microns but the average size of the droplets will be 50 microns in diameter. Misting is producing an average micron range for droplets above 50 microns. Either type of machine will work for misting the air for dust suppression. The fogging approach takes more time to settle since the water droplets are smaller and float more easily. Misting uses a little more liquid and the larger droplets fall more rapidly. Both types of machines require the use of respirators.

It should be noted that there must be supersaturation for the droplets to grow and combine with the particulate matter in the air. By supersaturating the atmosphere of the room to be cleaned, capture efficiency is increased, because more particles capture more particulate matter (asbestos, etc.), and thus more droplets become weighted down and fall to the floor, thereby cleaning the air.

The desired size of the water droplets is determined by a number of factors. The two principal factors are the atmospheric temperature and humidity. For instance, the above quoted 35-50 micron droplet size appears to be optimum in an atmosphere having a 40-60% relative humidity. If the droplets are too large and fall to fast, gravity overtakes the shear gradient coagulation. However, if the temperature is greater and the humidity is much lower, larger liquid particles are required, or the fogging time needs to be increased. If the droplets are too small, svocs become volatile in the air, whereas it is desired that the svocs stay bound to the water. It is also desired that the water not evaporate too quickly. Bigger droplets in such cases will be required for supersaturation. For example in the hot, dry climate of Arizona, it may be desired that the solution droplets be over 50 microns, and even over 200 microns.

The type of machines to dispense the misting agent are manufactured by Fog Master, B&G, ElectroFan, and Dramm. These types of machines can be used to mist or fog the misting agent All of the machines generally work the same way. Each fogger or mister creates enough pressure to disperse the misting agent at a small droplet size at various volumes per minute through one or more orifices, depending on motor sizes and preference.

Hand pumps that are used to dispense pesticides and herbicides that could also be used. These inexpensive devices would dispense greater amounts of the misting agent at much larger water droplet sizes with more labor which would partially offset the "green" benefits as well as reduce labor costs.

During the fogging/misting process, the fogging or misting machine is moved around the room, or at least a hose of the machine is moved around the room to maximize the area in which the solution is sprayed, allowing for an increase capture efficiency. It is to be remembered that sheer or gradient coagulation is being used, rather than thermal or kinematic coagulation. Particles flowing in a velocity gradient, even if they are the same size, will travel at different velocities because of their positions on different (but close) streamlines. This relative motion leads to collisions as particles on a faster streamline overtake those on nearby slower streamlines.

Turbulent flow produces eddies that cause relative motion between particles. This relative motion can come from velocity gradients in a manner similar to that just described or by the inertial projection of particles across the eddies. This latter becomes particularly important as the scale of the fluctuations (the size of the eddies) approaches the particle stopping distance. It is thus critical that as much of the air, and the surfaces in the room, be sprayed to maximize the surface area being exposed to the droplets. Such exposure increases the possibility of capture of the particulate matter (dust, asbestos, fibers, etc.) being exposed and captured by the liquid solution. A slow sweeping motion of the hose, or of the machine, is recommended to increase the capture efficiency.

On large projects, this lack of a need for large HEPA filtered negative air machines will greatly reduce electrical usage while helping to reduce the amount of water required by 80% to 95% versus typical misting processes using other reagents or solutions. The amount of the cleaning solution used varies from project to project, but one gallon of the proposed solution should be create a cloud of water droplets that capture particles in an 80,000 cubic feet area when dispensed by a B&G fogger. The machines generate an aerosol of liquid droplets that adheres to the particulates floating in the air as the droplets descend to horizontal surfaces. This area coverage amount could be less if personnel wear motor operated air purifying respirators (PAPR) which help supply air through filters to the respirators. The PAPR respirators would filter the air next to the motor of the personnel using the PAPR equipment which would necessitate further application of the misting or wetting agent. Also, continual releases of construction material or other particulate generating activities may necessitate further misting or fogging for this solution. At any rate, the amount of product required will be far less in volume than traditional misting or fogging agents that evaporate too quickly.

As the mist removes the particulate material from the air, the particulate material settles on surfaces. The settled particulate material is then removed by HEPA vacuuming, damp-wiping or using a dry cloth with a cationic charge (static cloth). For definitional purposes, the HEPA filter is a high efficiency particulate air filter that can capture particles down to 0.3 microns at a capture rate of 99.97 percent. Some HEPA filters are now even more sensitive. Damp wiping can be done with natural or synthetic fiber based cloths that are damp with any liquid including the misting or fogging agent. The damp wipe cloths can be disposed as waste material or laundered depending on the target agent removed from the air and surfaces.

Tests have been performed to determine the capabilities of the misting agent and process in removing asbestos and soot.

In the first test, Limpet (brand name) asbestos was removed from ducting in a high-rise condominium building. Limpet is a thermal surface insulation (TSI) comprised of 60-80% amosite, 2-5% chrysotile and 1-2% crocidolite. The material is very friable and resembles grey Rockwool insulation in appearance. It is wet applied with glue-like substance for adhesion. Amosite is known to repel water and crocidolite is known to be chemically resistant.

A 3 stage decontamination chamber including a shower in the middle stage was constructed. A negative air pressure machine was connected to the equipment room or dirty room so this room and the shower would be under negative air pressure. The work area was not under a negative air pressure differential. The building material in question was removed while a licensed industrial hygiene firm tested the air outside the whole containment system to ensure no cross-contamination. A personal air monitoring pump with a cassette was worn to collect an air sample of the immediate breathing space.

Fiber counts were purposely driven to high levels even though wet methods were used to remove the asbestos to determine if very high levels of asbestos could be removed from the air without the benefit of negative air pressure containment in the work area where asbestos was removed. The personal air samples were so overloaded only a transmission electron microscope could read the samples. The lowest result for personal air samples was over 1,000 structures per square millimeter. (OSHA recommends not exceeding a level greater than 1 cubic centimeter of asbestos fibers in a phase contrast microscopy sample with a light microscope.)

The post test results were extremely low (nothing detected, 1 structure detected and 2 structures detected). Normally, OSHA recommends 70 structures per square millimeter or less as acceptable. There was no cross-contamination detected by the industrial hygienist using phase contrast microscopy air samples read onsite by with a light microscope. A misting agent comprised of a solution of phenol, sodium phenate, sodium borate, sodium dodecylbenzene sulfonate, glycerol and water as the was used to clean the air in the containment.

To test for soot, a containment test chamber (8 feet by 10 feet with an 8 foot high ceiling) room was built from plastic and PVC poles with connectors. There was a single flap door on the side away from the wind to prevent cross-contamination or air clean air dilution of the test chamber. Exhaust was ducted with an inline fan pulling smoke from a fireplace burning wood charcoal, newspaper and motor oil. The oil was used to produce black smoke or soot (black carbon). The particles were uniform in size from 25 to 30 nanometers. Approximately 8 ounces of motor oil were burned, by pouring overi a folded newspaper on charcoal in the fireplace. Initially, effectiveness of soot removal was checked by taking air samples at 10 liters per minute for a set for 5 minutes before fogging the solutions, 2 hours after fogging the solutions and 4 hours after fogging the solutions. A determination was made as to how long to fog in the given area of the containment (1 minute, 3 minutes and 5 minutes), with 5 minutes proving to be the best time for effectiveness. All tests were performed in temperatures from 65 to 78 degrees Fahrenheit and relative humidity levels from 20 to 75% with average wind speeds not to exceed 15 miles per hour according to data available from various sources.

A 25 millimeter cassette with a mixed cellulose ester (MCE) with a pore size of 0.45 microns was used for testing. This cassette is normally used for asbestos sampling to be read by transmission electron microscopy (TEM). The samples were read with a light microscope magnified further by attaching a digital camera with a 10× lens coupler viewed on a television monitor. Images were easily viewed at 2,000× and see particles as small as 0.3 microns or 300 nanometers. A piece of cellophane tape (approximately 4 mm by 4 mm) was applied on the 25 mm MCE filter before sampling to get a visual comparison of clean MCE filter area versus soot filled areas near the tape location.

Comparison sampling was performed after filing the containment with smoke largely containing soot or black carbon (95%) of the sample. Sampling at the same time intervals previously listed was performed, along with a 30 minutes sample 4 hour after the filling of the chamber with smoke was stopped. Sampling continued for the every 30 minutes. The same process was performed for fogging with the misting agent (comprising the concentrated phenolic solution (phenol (1.6%), sodium phenate (0.6%), sodium borate, sodium dodecylbenzene sulfonate, glycerol and water), with the misting agent at 20% dilution, at a 10% dilution, just water and water with a quaternary ammonium surfactant. Samples indicated the water with surfactant was worse than water by itself. Water by itself was only moderately more effective than doing nothing.

The chamber reached a level of cleanliness (little to no observable particles) in air samples by using the full strength phenolic solution when the relative humidity was 70% or higher. Determination of cleanliness was made by reading the MCE filters using light microscopy. Success was achieved with a relative humidity of 50% with a 20% phenolic solution. The fogging time had to be doubled to 10 minutes with a 10% phenolic solution when the relative humidity was 20%. The average water droplet size applied by the B&G cold fogger machine was 35 to 50 microns.

A "before" and "4 hours after fogging" sample was sent to EMSL (SPELL THIS OUT) in New Jersey for confirmation by using the same type of cassette with additional polycarbonate filter with pores of 0.1 microns. The samples were taken at 12.5 liters per minute. The "before" sample was run for 30 minutes or 375 total liters of air. The "4 hours after fogging" sample was run for 2 hours or 1,500 liters. The samples were read for combustion byproducts with an electron microscope using different methods. The lab indicates the "before" sample was over loaded WITH 10 times more material than the "4 hours after fogging" sample.

The particles were uniform measuring 25-30 nanometers. This means that there was an approximate 90% reduction of the absolute hardest particle to remove via dust suppression since soot or black carbon is generally a combustion byproduct of hydrocarbons. These particles behave more like gas than particles according to many sources. They generally avoid water droplets by Brownian movement. This is the reason wet scrubber technology used a venturi design to mist combustion exhaust in pollution control. Additionally he 5 minutes of fogging time only used 37.5 ounces of the phenolic solution at each dilution in the 640 cubic foot containment. Samples were maintain for comparison of the different solutions.

While this disclosure has been described with an emphasis upon preferred embodiments, it will be obvious to those of ordinary skill in the art that variations of the preferred embodiments may be used and that it is intended that the disclosure may be practiced otherwise than as specifically described herein. Accordingly, this invention includes all modifications, alternative constructions, and equivalents encompassed within the spirit and the scope of the disclosure.

What we claim is:

1. A method for removing a solid contaminant from ambient air within an enclosed building, said method comprising:
   a) obtaining a liquid mixture, said liquid mixture comprising:
      i) at least one compound, wherein at least one of said at least one said compound is a semi-volatile organic compound;
      ii) water; and
      iii) a fire suppressant;
   b) spraying in an atomized form said liquid mixture into said ambient air of and within said enclosed building to remove said solid contaminant;
   c) allowing for said atomized form of said liquid mixture to intermingle with said solid contaminant in the ambient air and to be pulled down by gravity until said liquid mixture now containing said solid contaminant falls from the ambient air to land on a surface; and
   d) removing said liquid mixture containing said solid contaminant from said surface upon which said liquid mixture containing said solid contaminants lands,
      wherein said at least one of said at least one compound being a semi-organic compound is selected from the group consisting of: phenols, phenyls, benzyls, glycols, glycerol, butadienes, carboxyl groups, terpenes, anthracenes, isophorenes, plant esters, ketones, amines, glycol ethers, pyrenes, toluenes, phthalates, heterocyclic compounds, polycyclic aromatic hydrocarbons, mono and di aromatics, polyols, xanthenes, plant essential oils, enzymes from microbes, and combinations thereof.

2. The method according to claim 1, wherein a machine is used to produce a spray of said atomized form of said liquid mixture, said machine being selected from the group consisting of a fogging machine and a misting machine.

3. The method according to claim 1, wherein said semi-volatile organic compounds are selected from the group consisting of phenol, sodium phenate, and glycerol.

4. The method according to claim 1, wherein said fire suppressant is a borate.

5. The method according to claim 4, wherein said fire suppressant is sodium borate.

6. The method according to claim 4, wherein said fire suppressant is potassium borate.

7. The method according to claim 1, wherein said fire suppressant is present in the amount of about 0.1% to about 10%.

8. The method according to claim 7, wherein said fire suppressant is present in the amount of about 0.5% to about 5%.

9. The method according to claim 8, wherein said fire suppressant is present in the amount of about 0.5% to 1%.

10. The method according to claim 1, wherein said liquid mixture further comprises a detergent.

11. The method according to claim 1, wherein said liquid mixture further comprises a surfactant.

12. The method according to claim 11, wherein said liquid mixture comprises:
    a) from about 0.25% to about 20% said semi-volatile organic compounds;
    b) from about 0.1% to about 3% said surfactants;
    c) from about 0.1 to about 10% said fire suppressant; and
    c) from about 70% to about 99.5% said water.

13. The method according to claim 1, wherein said liquid mixture comprises from about 0.25% to about 10% semi-volatile organic compounds.

14. The method according to claim 1, wherein said semi-volatile organic compounds were emulsified.

15. The method according to claim 1, wherein an area to be treated is under neutral air pressure differential.

16. The method according to claim 2, wherein said liquid mixture is introduced into said area by a technique selected from the group consisting of misting and fogging with the size of sprayed droplets being equal or less than about 50 microns.

17. The method according to claim 16, wherein the size of said sprayed droplets is between about 35 and about 50 microns.

18. The method according to claim 2, wherein said liquid mixture is introduced into said area by a technique selected from the group consisting of misting and fogging with the size of sprayed droplets being equal or greater than 50 microns.

19. The method according to claim 17, wherein a machine used to produce either the misting or the fogging is moved around the world to increase dispersal and capture efficiency of the liquid mixture.

20. The method according to claim 17, wherein a hose spraying the liquid mixture is moved around the room being treated to increase dispersal and capture efficiency of the liquid mixture.

21. A method of decontaminating ambient air within an enclosed building, comprising:
   a) obtaining a liquid mixture, said liquid mixture comprising:
      i) at least one compound, wherein at least one of said at least one said compound is a semi-volatile organic compound;
      ii) water; and
      iii) a fire suppressant;
   b) spraying in an atomized form said liquid mixture into said ambient air of and within said enclosed building to remove said solid contaminant;
   c) allowing for said atomized form of said liquid mixture to intermingle with contaminants in the ambient air and to be pulled down by gravity until said liquid mixture now containing said contaminant falls from the ambient air to land on a surface; and
   d) removing said liquid mixture containing said contaminants from said surface upon which said liquid mixture containing said solid contaminants lands, wherein said at least one of said at least compound being a semi-organic compound is selected from the group consisting of: phenols, phenyls, benzyls, glycols, glycerol, butadienes, carboxyl groups, terpenes, anthracenes, isophorenes, plant esters, ketones, amines, glycol ethers, pyrenes, toluenes, phthalates, heterocyclic compounds, polycyclic aromatic hydrocarbons, mono and di aromatics, polyols, xanthenes, plant essential oils, enzymes from microbes, and combinations thereof.

* * * * *